(12) United States Patent
Wang et al.

(10) Patent No.: US 8,425,221 B2
(45) Date of Patent: Apr. 23, 2013

(54) MOLD ASSEMBLY HAVING EJECTION MECHANISM

(75) Inventors: Xian-yun Wang, Tu Cheng (TW);
Xiao-ping Wu, Tu Cheng (TW);
Kun-hsueh Chiang, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 404 days.

(21) Appl. No.: 12/960,382

(22) Filed: Dec. 3, 2010

(65) Prior Publication Data

US 2012/0141620 A1   Jun. 7, 2012

(51) Int. Cl.
*B29C 45/40* (2006.01)
*B29C 45/80* (2006.01)

(52) U.S. Cl.
USPC .......................... 425/556; 425/139; 425/595

(58) Field of Classification Search ............... 425/139, 425/556, 577, 595
See application file for complete search history.

(56) References Cited

U.S. PATENT DOCUMENTS

| | | | |
|---|---|---|---|
| 1,919,534 A * | 7/1933 | Shaw | 425/543 |
| 2,233,057 A * | 2/1941 | Luce | 65/305 |
| 2,574,223 A * | 11/1951 | Nichols | 425/544 |
| 2,994,921 A * | 8/1961 | Hultgren | 425/308 |
| 3,091,809 A * | 6/1963 | Trueblood | 425/165 |
| 3,196,483 A * | 7/1965 | Eyles | 425/311 |
| 3,197,825 A * | 8/1965 | Hammond | 164/345 |
| 3,669,598 A * | 6/1972 | Tucker | 425/556 |
| 3,788,794 A * | 1/1974 | Hehl | 425/451.9 |
| 3,893,644 A * | 7/1975 | Drazick | 249/68 |
| 4,162,886 A * | 7/1979 | Holland et al. | 425/556 |
| 4,403,810 A * | 9/1983 | Bieneck | 425/589 |
| 5,340,528 A * | 8/1994 | Machida et al. | 264/328.7 |
| 5,429,492 A * | 7/1995 | Taniyama | 425/556 |
| 5,460,508 A * | 10/1995 | Ohno et al. | 425/554 |
| 5,492,658 A * | 2/1996 | Ohno et al. | 264/40.1 |
| 5,512,223 A * | 4/1996 | Morikita | 264/71 |
| 5,587,189 A * | 12/1996 | Niimi | 425/577 |
| 6,086,355 A * | 7/2000 | Rozema et al. | 425/556 |
| 6,187,247 B1 * | 2/2001 | Buzzell et al. | 264/334 |
| 6,224,810 B1 * | 5/2001 | Tsutsumi | 264/272.15 |
| 7,338,279 B2 * | 3/2008 | Hashimoto et al. | 425/577 |
| 7,963,758 B2 * | 6/2011 | Starkey et al. | 425/190 |
| 2004/0076703 A1 * | 4/2004 | Saulle | 425/190 |
| 2007/0222097 A1 * | 9/2007 | Nishimura et al. | 264/40.1 |

* cited by examiner

*Primary Examiner* — Yogendra Gupta
*Assistant Examiner* — Emmanuel S Luk
(74) *Attorney, Agent, or Firm* — Cheng-Ju Chiang

(57) ABSTRACT

A mold assembly having an ejection mechanism is disclosed and has a female mold, a male mold, a lower fixing plate, an upper ejection plate, at least one upper ejection pin, a lower ejection plate, at least one lower ejection pin and at least one process control mechanism. The female and male molds are closed to commonly define a mold cavity. The lower fixing plate and the male mold commonly define a receiving space therebetween to receive the upper ejection plate and the lower ejection plate which can be shifted upward and downward therein. The upper and lower ejection pins are mounted on the upper and lower ejection plates, respectively. The process control mechanism controls the upper and lower ejection pins to eject a molded product in two steps, so that the molded product can be automatically ejected for enhancing the manufacture efficiency of the mold assembly.

6 Claims, 7 Drawing Sheets

MOLD ASSEMBLY HAVING EJECTION MECHANISM

FIELD OF THE INVENTION

The present invention relates to a mold assembly, and more particularly to a mold assembly having an ejection mechanism.

BACKGROUND OF THE INVENTION

Referring now to FIG. 1, a molded product 200 is illustrated, wherein the molded product 200 has a lower wall 201 and a side wall 202, both of which commonly define a recess therein. Traditionally, after a mold assembly (not-shown) used to fabricate the molded product 200 is opened, ejection pins 50' of an ejection mechanism of the mold assembly will be extended into the recess of the molded product 200. However, the ejection pins 50' may be engaged with the molded product 200, and thus the molded product 200 may not be completely ejected from the mold assembly. As a result, the manufacture efficiency of the mold assembly will be lowered, while the operational risk thereof will be increased.

SUMMARY OF THE INVENTION

A primary object of the present invention is to provide a mold assembly having an ejection mechanism, which is convenient to eject a mold product, so as to enhance the manufacture efficiency of the mold assembly.

To achieve the above object, a mold assembly having an ejection mechanism of a preferred embodiment of the present invention is used to form a molded product having a lower wall and a side wall to commonly define a recess, and the mold assembly comprises: a female mold, a male mold, a lower fixing plate, an upper ejection plate, at least one upper ejection pin, a lower ejection plate, at least one lower ejection pin and at least one process control mechanism. The female mold and the male mold are disposed corresponding to each other. When the female mold and the male mold are closed, the female mold and the male mold commonly define a mold cavity. The lower fixing plate is disposed under the male mold, while the male mold and the lower fixing plate commonly define a receiving space therebetween. The upper ejection plate is movably received in the receiving space, and a side surface of the upper ejection plate is formed with a receiving recess. The upper ejection pin is mounted on the upper ejection plate, and one end of the upper ejection pin is correspondingly abutted against a position of the lower wall of the molded product closed to a side wall. The lower ejection plate is movably received in the receiving space. The lower ejection pin is mounted on the lower ejection plate, and one end of the lower ejection pin is correspondingly abutted against an end edge of the side wall of the molded product. The process control mechanism has a side press block mounted on a side surface of the male mold, a transverse stop block movably received in the receiving recess of the upper ejection plate, an elastic member received in the receiving recess, and an upper push block mounted on a side surface of the lower ejection plate. The side press block has a side press surface inclined extended therefrom; the transverse stop block has a guiding surface; the elastic member is used to push an outer end of the transverse stop block out of the receiving recess; and the upper push block is used to push the outer end of the transverse stop block. The side press surface of the side press block can push the outer end of the transverse stop block into the receiving recess.

As describe above, according to the mold assembly having the ejection mechanism of the present invention, the process control mechanism controls the upper and lower ejection pins to eject a molded product out of the mold assembly in two steps, so that the molded product can be automatically ejected for enhancing the manufacture efficiency of the mold assembly.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 1:
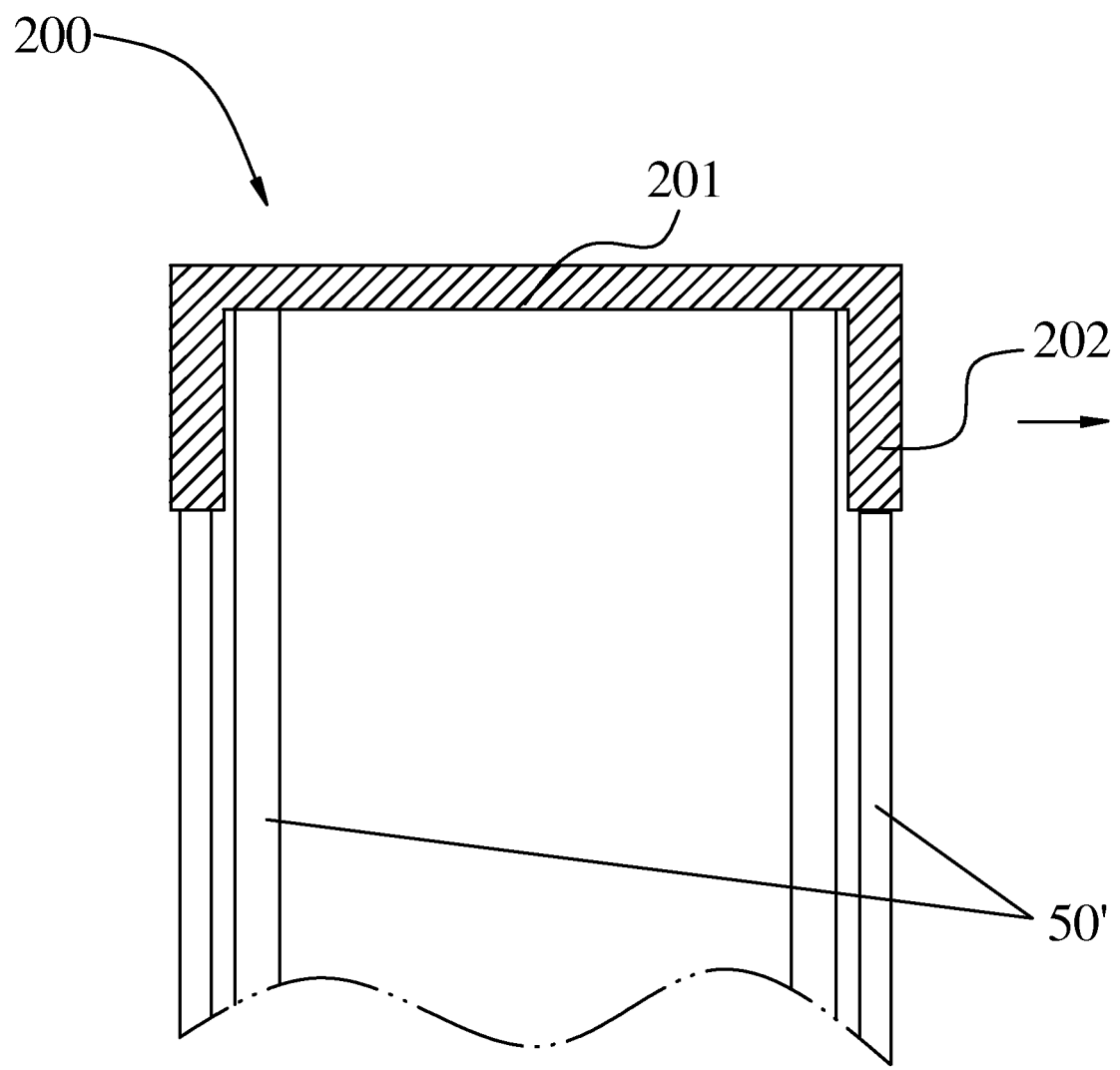
FIG. 1 is a schematic view of a traditional mold assembly during a molded product is unmolded.
Figure 2:
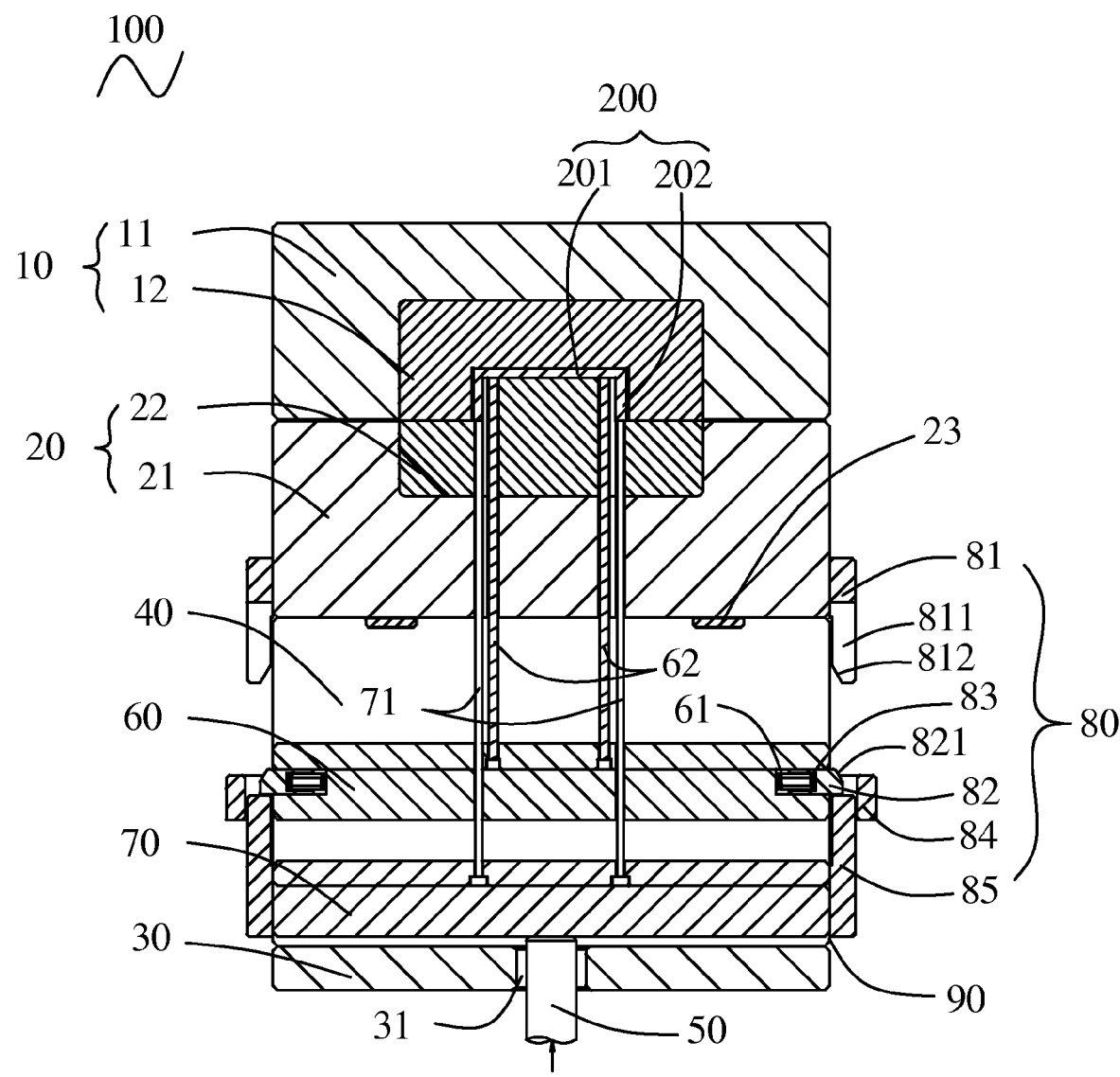
FIG. 2 is an assembled cross-sectional view of a mold assembly having an ejection mechanism according to a preferred embodiment of the present invention before the mold assembly is opened.
Figure 3:
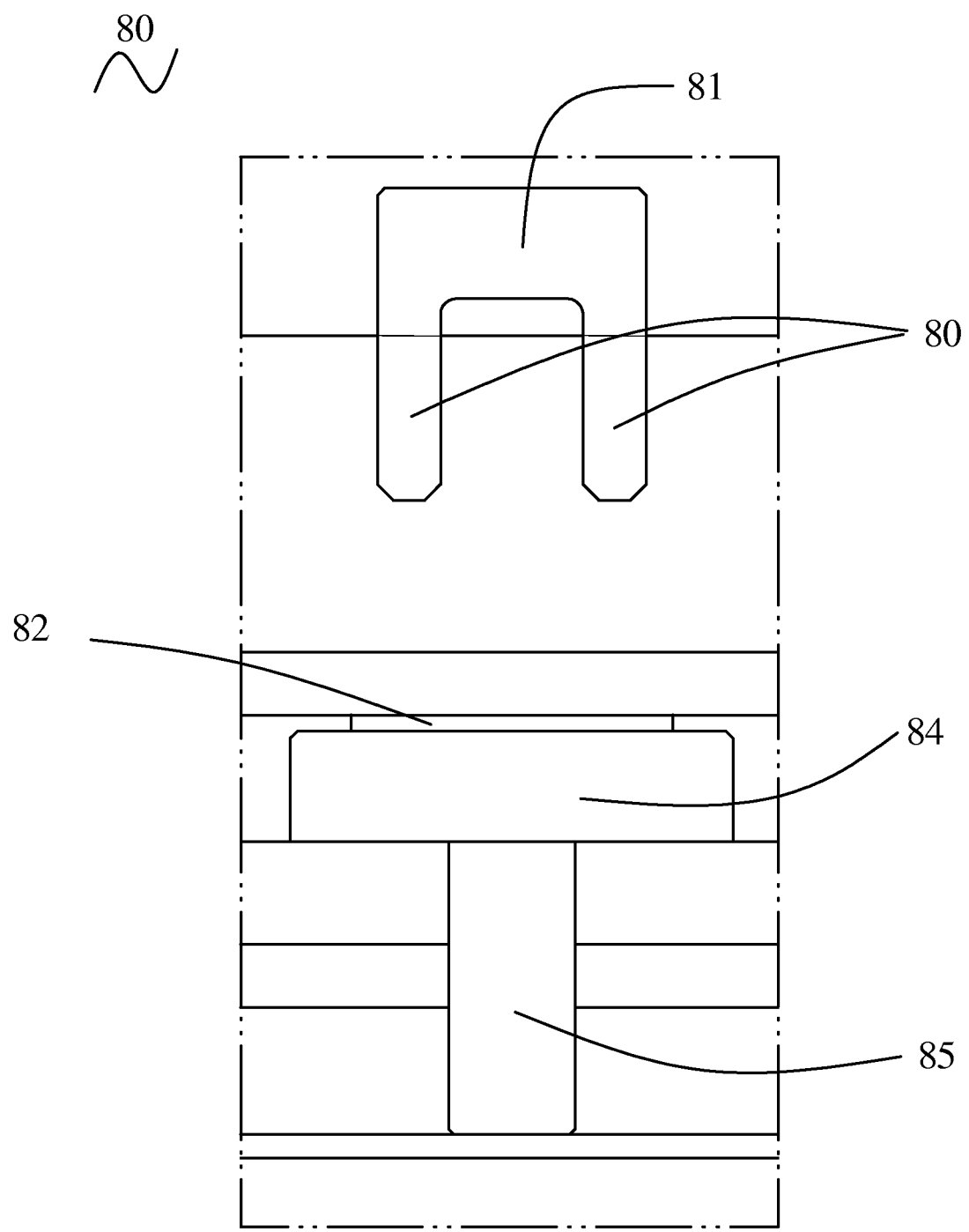
FIG. 3 is a schematic side view of a process control mechanism according to the preferred embodiment of the present invention, as shown in FIG. 2.
Figure 4:
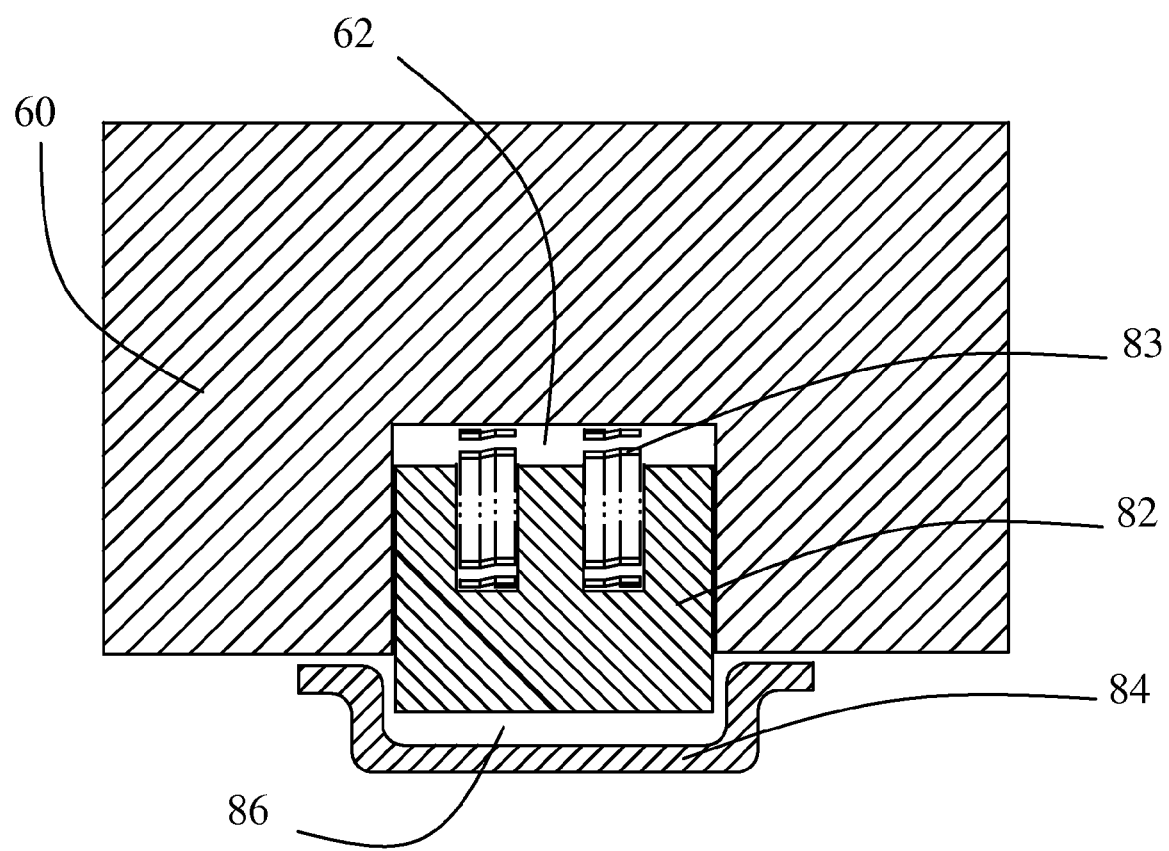
FIG. 4 is a horizontally cross-sectional view of a retaining member and a transverse stop block according to the preferred embodiment of the present invention, as shown in FIG. 2.

Referring now to FIGS. 2, 3 and 4, a mold assembly having an ejection mechanism according to a preferred embodiment of the present invention is illustrated. As shown, a mold assembly 100 comprises a female mold 10, a male mold 20, a lower fixing plate 30, a machine push rod 50, an upper ejection plate 60, two upper ejection pins 61, a lower ejection plate 70, two lower ejection pins 71, two process control mechanisms 80 and two support blocks 90.

The female mold 10 has a female mold plate 11 and a female mold core 12 mounted on the female mold plate 11.

The male mold 20 and the female mold 10 are disposed corresponding to each other. The male mold 20 has a male mold plate 21 and a male mold core 22 mounted on the male mold plate 21. A lower surface of the male mold plate 21 is provided with at least one retaining pin 23. When the male mold 20 and the female mold 10 are closed, the male mold core 22 and the female mold core 12 can commonly define a mold cavity (not-shown). The lower fixing plate 30 is disposed under the male mold 20, and the lower fixing plate 30 is formed with a push-rod hole 31, wherein the machine push rod 50 of an injection machine (not-shown) can pass through the push-rod hole 31. The two support blocks 90 are supported between the male mold plate 21 and the lower fixing plate 30, so that the male mold plate 21 and the lower fixing plate 30 commonly define a receiving space 40 therebetween.

The upper ejection plate 60 and the lower ejection plate 70 are movably received in the receiving space 40, and can be shifted upward and downward in the receiving space 40. A side surface of the upper ejection plate 60 is formed with two receiving recesses 62. The two upper ejection pins 61 are mounted on the upper ejection plate 60, and one end of each of the upper ejection pins 61 is correspondingly abutted against a position of a lower wall 201 of a molded product 200 closed to a side wall 202. In addition, the two lower ejection pins 71 are mounted on the lower ejection plate 70, and one end of each of the lower ejection pins 71 is correspondingly abutted against an end edge of the side wall 202 of the molded product 200. Thus, the upper ejection pins 61 can support an inner periphery of the side wall 202, so as to ensure that the lower ejection pins 71 can abut against the end edge of the side wall 202.

Each of the process control mechanism 80 comprises: a side press block 81 mounted on a side surface of the male mold plate 21 of the male mold 20, a transverse stop block 82 movably received in the receiving recess 62 of the upper ejection plate 60, an elastic member 83 received in the receiving recess 62, a retaining member 84 mounted on the upper ejection plate 60, and an upper push block 85 mounted on a side surface of the lower ejection plate 70. The side press block 81 has two side press portions 811 extended downward therefrom, and each of the two side press portions 811 has a side press surface 812 inclined extended from a distal end thereof, wherein the upper push block 85 can be extended into a space between the two side press portions 811. The transverse stop block 82 has a guiding surface 821. The elastic member 83 is used to push an outer end of the transverse stop block 82 out of the receiving recess 62. The retaining member 84 and the upper ejection plate 60 commonly define a through hole 86, as shown in FIG. 4. The side press portions 811 and the upper push block 85 can be extended into the through hole 86, so that the retaining member 84 can protect the side press portion 811 and the upper push block 85 to prevent the side press portion 811 and the upper push block 85 from being deformed due to the counterforce of the transverse stop block 82. The upper push block 85 can be used to push the outer end of the transverse stop block 82, and the side press surface 812 of the side press block 81 can push the outer end of the transverse stop block 82 into the receiving recess 62.

Referring still to FIGS. 2, 3 and 4, when the mold assembly 100 having the ejection mechanism of the present invention is closed, the upper ejection plate 60 and the lower ejection plate 70 commonly define a space therebetween. After a molded product 200 is formed, the upper push block 85 pushes the outer end of the transverse stop block 82, wherein one end of each of the two upper ejection pins 61 is correspondingly abutted against a position of a lower wall 201 of a molded product 200 closed to a side wall 202, while one end of each of the two lower ejection pins 71 is correspondingly abutted against an end edge of the side wall 202 of the molded product 200.

Figure 5:
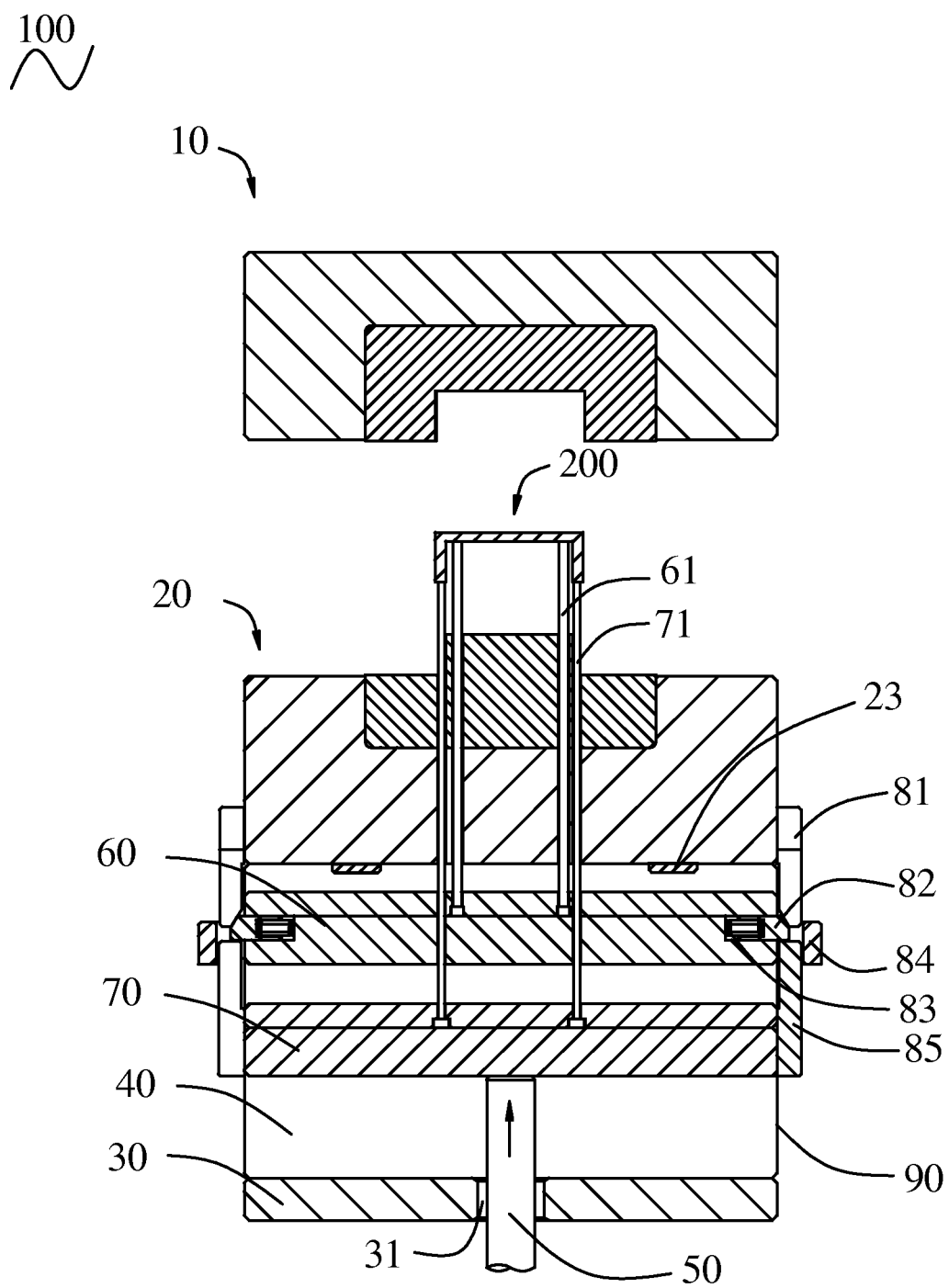
FIG. 5 is an operational view of a first status of the mold assembly having the ejection mechanism according to the preferred embodiment of the present invention during the mold assembly is opened.
Figure 6:
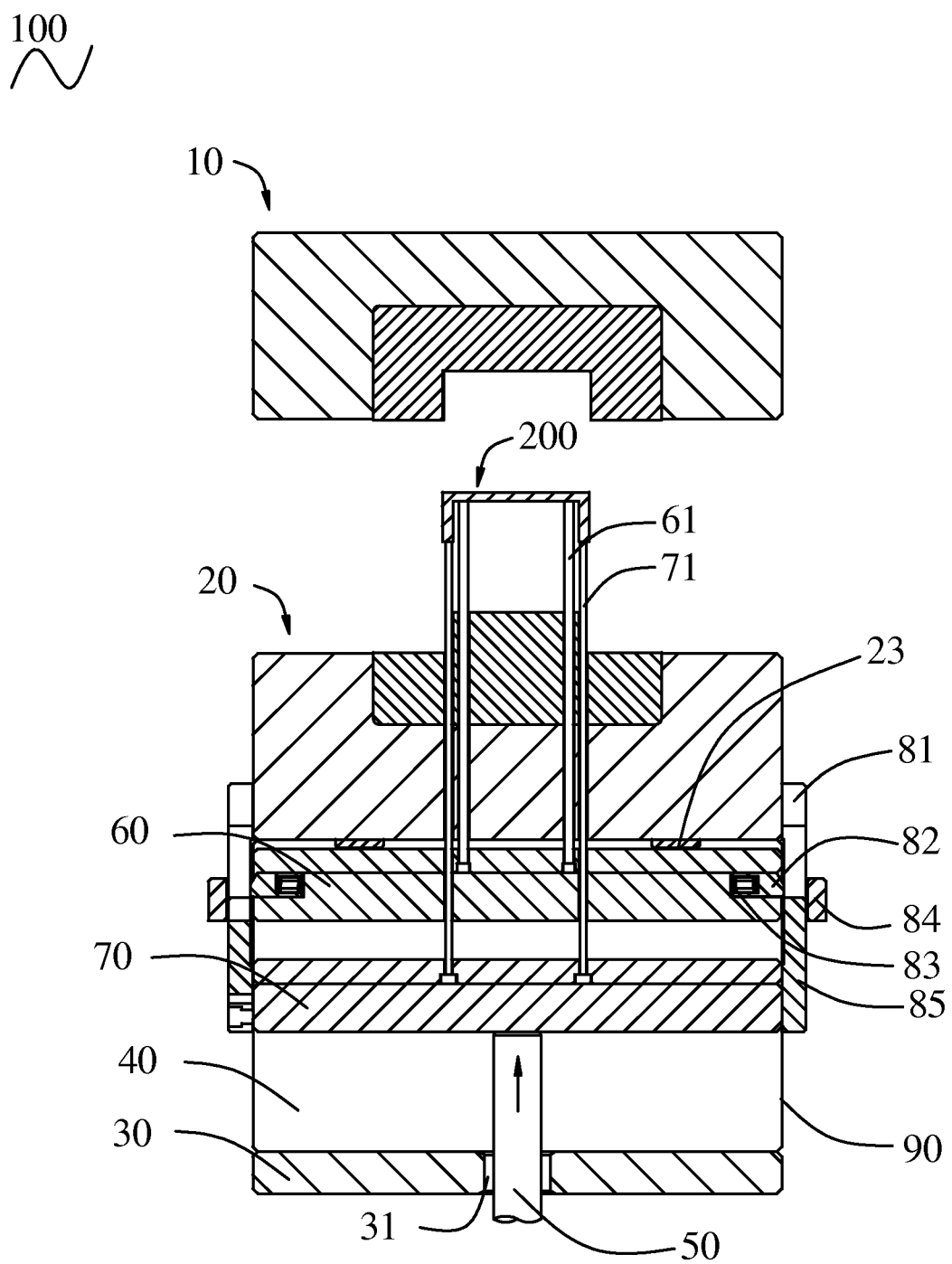
FIG. 6 is an operational view of a second status of the mold assembly having the ejection mechanism according to the preferred embodiment of the present invention during the mold assembly is opened.
Figure 7:
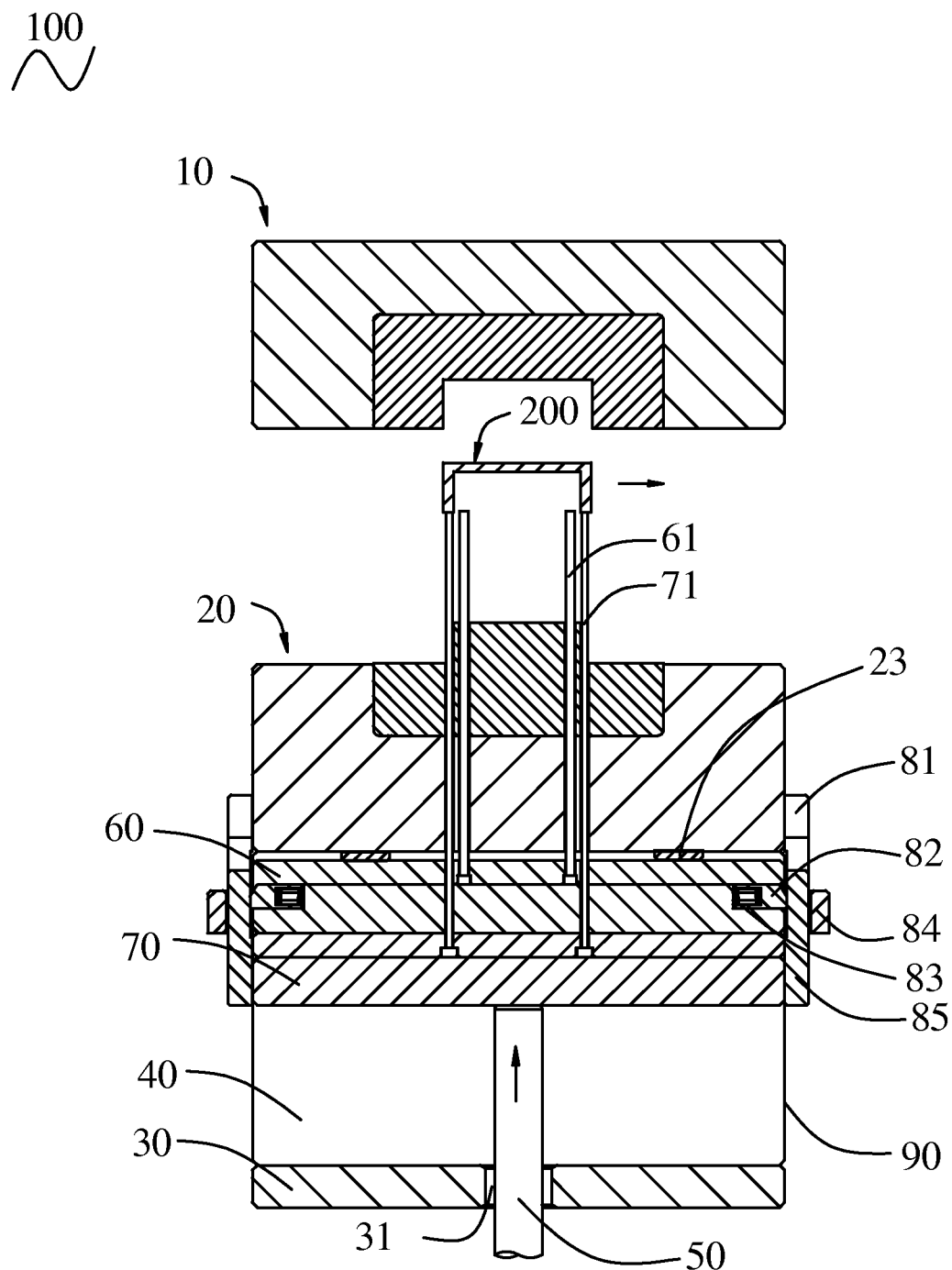
FIG. 7 is an operational view of a third status of the mold assembly having the ejection mechanism according to the preferred embodiment of the present invention during the mold assembly is opened.

Referring to FIGS. 5, 6 and 7, a first status, a second status and a third status of the mold assembly 100 having the ejection mechanism of the present invention during opening the mold assembly 100 are illustrated, wherein the machine push rod 50 provides an ejection force.

Referring to FIG. 5, during opening the mold assembly 100, the machine push rod 50 pushes the lower ejection plate 70 upward. Thus, the upper push block 85 pushes a lower portion of the outer end of the transverse stop block 82, so as to actuate the upper ejection plate 60 to simultaneously shift upward, wherein the two upper ejection pins 61 and the two lower ejection pins 71 eject the molded product 200 out of the male mold core 22.

Referring to FIG. 6, after this, the machine push rod 50 keeps pushing the lower ejection plate 70 upward. Thus, the side press surface 812 of the side press block 81 is in contact with the guiding surface 821 of the transverse stop block 82, so that the transverse stop block 82 is gradually retracted into the receiving recess 62. When the transverse stop block 82 is completely retracted into the receiving recess 62, the upper ejection plate 60 is abutted against the retaining pins 23 on the lower surface of the male mold plate 21, so that the two upper ejection pins 61 stop ejecting upward.

Referring to FIG. 7, the two lower ejection pins 71 keep ejecting the molded product 200 upward, until the lower ejection plate 70 is in contact with the upper ejection plate 60. At this time, the two upper ejection pins 61 are separated from the recess of the molded product 200, so that the molded product 200 can be easily removed.

On the other hand, when closing the mold assembly 100 having the ejection mechanism of the present invention, the upper ejection plate 60 and the lower ejection plate 70 are returned to original positions thereof, and then the two upper ejection pins 61, the two lower ejection pins 71 and the upper push block 85 are all returned. Thus, the transverse stop block 82 is returned due to the bias of the elastic member 83.

As describe above, according to the mold assembly 100 having the ejection mechanism of the present invention, the process control mechanism 80 controls the upper and lower ejection pins 61, 71 to eject the molded product 200 out of the mold assembly 100 in two steps, so that the molded product 200 can be automatically ejected out of the mold assembly 100 for enhancing the manufacture efficiency of the mold assembly 100.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A mold assembly having an ejection mechanism for forming a molded product having a lower wall and a side wall to commonly define a recess, the mold assembly comprising:
   a female mold;
   a male mold disposed corresponding to female mold, wherein the female mold and the male mold commonly define a mold cavity;
   a lower fixing plate disposed under the male mold, wherein the male mold and the lower fixing plate commonly define a receiving space therebetween;
   an upper ejection plate movably received in the receiving space, wherein a side surface of the upper ejection plate is formed with a receiving recess;
   at least one upper ejection pin mounted on the upper ejection plate, wherein one end of the upper ejection pin is correspondingly abutted against a position of the lower wall of the molded product closed to a side wall;
   a lower ejection plate movably received in the receiving space;
   at least one lower ejection pin mounted on the lower ejection plate, wherein one end of the lower ejection pin is correspondingly abutted against an end edge of the side wall of the molded product; and a process control mechanism having a side press block mounted on a side surface of the male mold, a transverse stop block movably received in the receiving recess of the upper ejection plate, an elastic member received in the receiving recess, and an upper push block mounted on a side surface of the lower ejection plate;

wherein the side press block has a side press surface inclined extended therefrom; the transverse stop block has a guiding surface;

the elastic member pushes an outer end of the transverse stop block out of the receiving recess; the upper push block pushes the outer end of the transverse stop block; and the side press surface of the side press block pushes the outer end of the transverse stop block into the receiving recess.

2. The mold assembly having the ejection mechanism according to claim 1, wherein the female mold has a female mold plate and a female mold core mounted on the female mold plate, while the male mold has a male mold plate and a male mold core mounted on the male mold plate, wherein the mold cavity is commonly defined by the male mold core and the female mold core.

3. The mold assembly having the ejection mechanism according to claim 1, wherein the upper ejection plate has two of the upper ejection pins, while the lower ejection plate has two of the lower ejection pins.

4. The mold assembly having the ejection mechanism according to claim 1, wherein the side press block has two side press portions, and each of the two side press portions has a side press surface extended from a distal end thereof, wherein the upper push block 85 is extended into a space between the two side press portions.

5. The mold assembly having the ejection mechanism according to claim 4, wherein a retaining member is mounted on a side surface of the upper ejection plate, while the retaining member and the upper ejection plate commonly define a through hole, wherein the side press portions and the upper push block are extended into the through hole.

6. The mold assembly having the ejection mechanism according to claim 2, wherein a lower surface of the male mold plate is provided with at least one retaining pin.

* * * * *